United States Patent [19]

Hine, Jr.

[11] 4,315,583

[45] Feb. 16, 1982

[54] HANDLEBAR PACK SUPPORT

[75] Inventor: Edward K. Hine, Jr., Louisville, Colo.

[73] Assignee: Hine-Snowbridge, Boulder, Colo.

[21] Appl. No.: 189,480

[22] Filed: Sep. 22, 1980

[51] Int. Cl.³ .............................................. B62J 7/06
[52] U.S. Cl. ................................. 224/41; 224/30 A; 224/36
[58] Field of Search .................... 224/30 A, 33 A, 36, 224/41

[56] References Cited

U.S. PATENT DOCUMENTS

| | | | |
|---|---|---|---|
| 584,207 | 6/1897 | Carter | 224/36 |
| 607,782 | 7/1898 | Erwin | 224/41 |
| 612,646 | 10/1898 | Howell et al. | 224/36 X |
| 637,762 | 11/1899 | Buley et al. | 224/36 X |
| 2,492,595 | 12/1949 | Rhoer | 224/41 |
| 3,955,728 | 5/1976 | Jackson et al. | 224/36 X |
| 4,066,196 | 1/1978 | Jackson et al. | 224/30 A |
| 4,260,086 | 4/1981 | Hine, Jr. et al. | 224/30 A X |

*Primary Examiner*—Steven M. Pollard
*Attorney, Agent, or Firm*—O'Rourke & Harris

[57] ABSTRACT

A structure for attachment to the handlebars of a vehicle such as a bicycle including first and second engaging members, one of which is adapted to fit under the gooseneck intersection with the handlebars and over the handlebars, and the other of which is adapted to fit over the gooseneck section and under the handlebars, and a clamping device to engage both the first and second members to provide positive attachment to the bicycle handlebars, one of the first and second members also including a bag engaging means, preferably in the form of spaced, parallel extending portions adapted to engage pockets defined on the sides of a handlebar pack.

12 Claims, 4 Drawing Figures

HANDLEBAR PACK SUPPORT

BACKGROUND OF THE INVENTION

1. Field of the Invention

The present invention relates generally to devices adapted to secure packs to the handlebars of a bicycle, and more particularly to a bicycle support system in the form of wire members configured to be securely clamped to the handlebar-gooseneck intersection of a bicycle, with convenient release of the clamping means to provide a stable and secure mounting for a bicycle pack.

2. Description of the Related Art

A number of bicycle pack supports and packs adapted to be secured to a bicycle handlebar structure have been known for some time. While initial efforts involved the use of straps or clips to directly attach a basket or pack to a bicycle handlebar, more recent efforts have involved wire supports which are positioned under the gooseneck portion of a bicycle handlebar arrangement and over the handlebar proper to extend forward in a cantilevered fashion. Particularly desirable pack attachment for such supports has involved bifurcated forward extending members which engaged the bicycle pack at pockets on the upper, opposed sides of the pack. Since such supports are generally positioned by gravity, and particularly so in the case of wire supports, use of elastomeric members such as "bungee" cords extending from the pack to the front wheel axle portion of the bicycle, or alternatively to the adjacent portions of the frame have been employed to pretension the pack into the desired position.

The related art most appropriately illustrating the above pack and support arrangement is included in U.S. Pat. Nos. 3,955,728, 4,056,219 and 4,066,196. Wire supports which constitute the heretofore preferred pack support are illustrated and described in the latter two patents. Though the cantilevered wire supports constitute a substantial improvement over previous arrangements, such supports are not without drawbacks. Without preloading, the pack and support have a distinct tendency to "fly up" when the hard sprung bicycle strikes a rough spot in the road. With pretensioning, the problem is diminished but not entirely avoided since the pretensioning typically is accomplished with resilient members, with accompanying compliance. Also, the need for such pretensioning devices makes the attachment, transport away from the bicycle, and general use of packs including such resilient members somewhat cumbersome.

SUMMARY OF THE INVENTION

The present invention, which provides heretofore unavailable improvements over previous bicycle handlebar pack supports, comprises two wire members which extend around the gooseneck and handlebar portion of a bicycle on opposite sides thereof, and which are clamped together forward of the gooseneck to provide a secure and positive attachment of the support to the bicycle. Bag attachment means, which preferably are similar to prior art arrangements, and preferably are parallel extending members adapted to engage the bag at pockets at the upper side portions, are provided forward of the clamping portion. The clamp member is preferably of a quick removal type or arrangement to provide convenient removal of the support from the bicycle. The positive clamping arrangement substantially eliminates the undesirable moving or flapping of a bicycle pack as resulted with prior arrangements in which the support was merely cantilevered by the force of gravity, and was freely movable in the presence of negative gravitational forces such as might be induced by ordinary movement of a bicycle over a roadway.

Accordingly, an object of the present invention is to provide a new and improved bicycle handlebar support arrangement for handlebar packs which is convenient, lightweight and which positively engages the bicycle handlebar structure for secure location of the support.

Another object of the present invention is to provide a new and improved bicycle handlebar pack support which may be readily attached to and removed from a bicycle handlebar arrangement.

Still another object of the present invention is to provide a new and improved bicycle handlebar support which resists movement of a pack attached thereto.

These and other objects and features of the invention will become apparent from the following description.

DETAILED DESCRIPTION OF THE INVENTION

Figure 1:
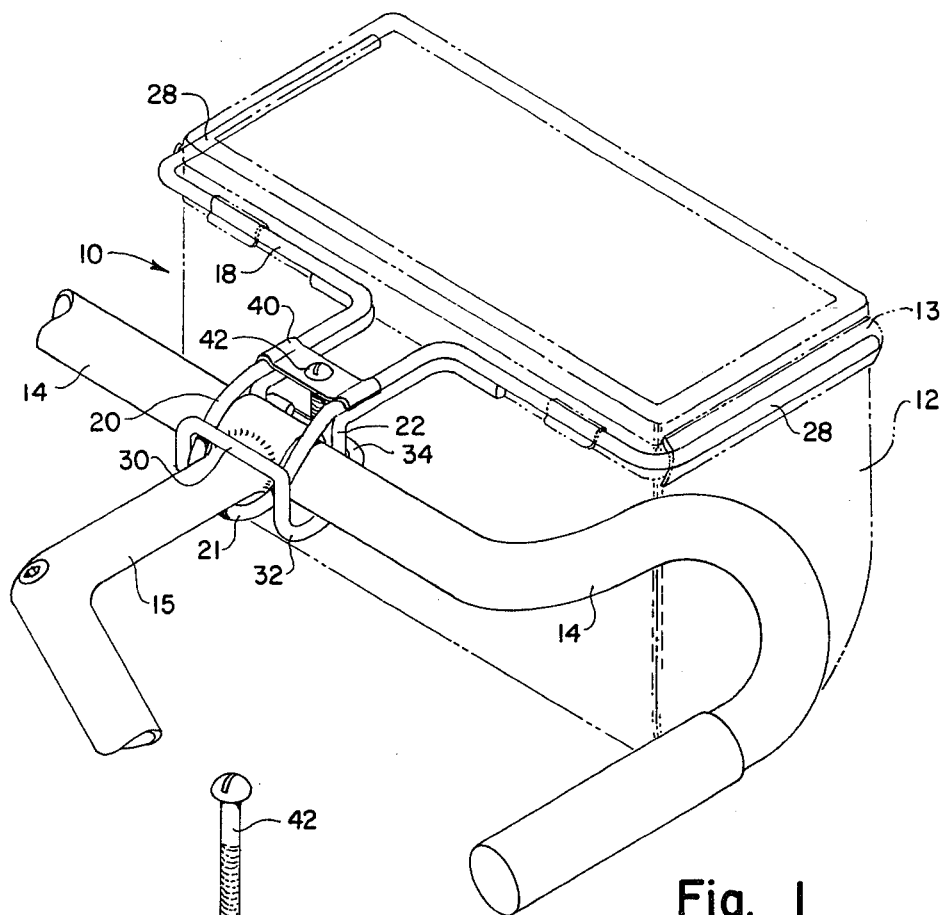
FIG. 1 is a perspective view of a bicycle pack support in place on a bicycle handlebar arrangement with the pack illustrated in a ghosted manner.
Figure 2:
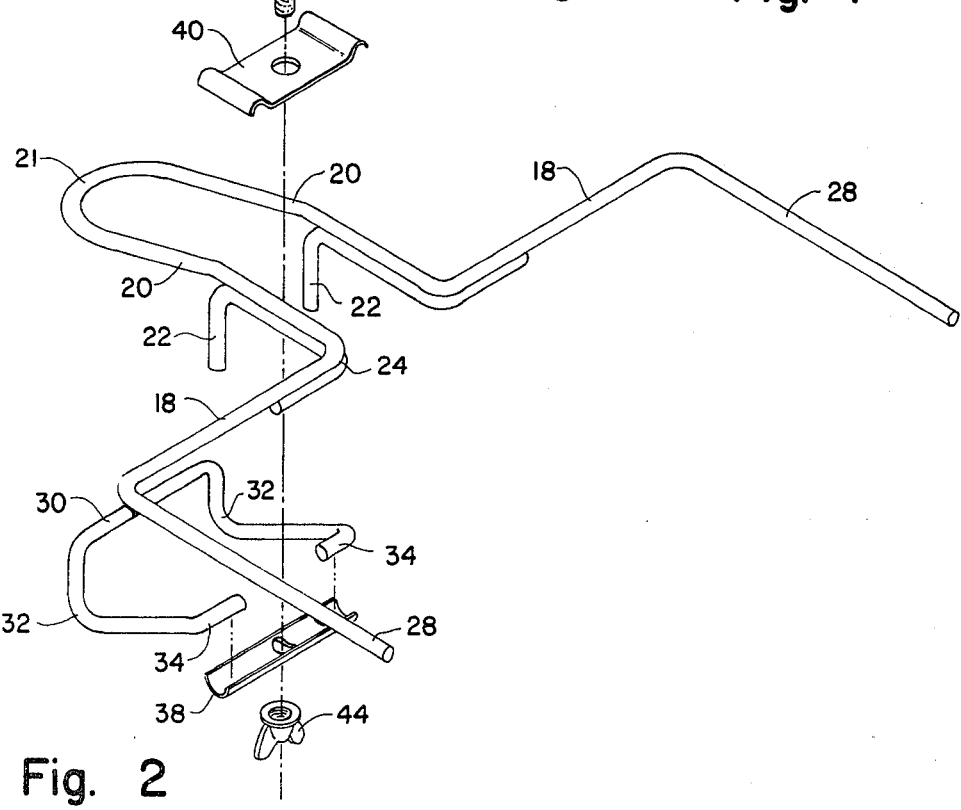
FIG. 2 is an exploded view of the embodiment of a bicycle pack support set forth in FIG. 1.

Turning now to the drawings, wherein like components are designated by like reference numerals throughout the various FIGURES, a handlebar pack support assembly in accord with the instant invention is illustrated in FIGS. 1 and 2, and is generally designated by reference numeral 10. As shown in FIG. 1, a pack 12 is illustrated in a ghosted manner and includes a preferred mounting arrangement in which pack support pockets 13 are provided on either side of the upper portion of pack 12. In conjunction with securing means on the rear wall of pack 12, pockets 13 serve as a preferred arrangement for attachment to pack support 10, but do not constitute a substantial portion of the invention which is suitable for use with a great variety of interface attachments between pack 12 and pack support 10.

As further shown in FIG. 1, conventional bicycle components, handlebar 14 and gooseneck 15, serve to support wire pack support 10. More specifically, pack support 10 includes diverging pack engaging portions 18, adapted to bear against the rear wall of pack 12, though again this constitutes but a preferred arrangement and not a required structure. In a more critical area of the invention, pack support 10 includes a pair of forward extending members 20 which are joined at U-shaped curved portion 21. Locating members 22 are attached one each to forward extending members 20, and include depending portions positioned to bear against the forward surface of handlebar 14. Preferably locating members 22 extend through curved portions 24 linking forward extending members 20 and pack engaging portions 18 of pack support 10 to provide reinforcement at these more highly stressed junctures. As shown in more detail in FIG. 1, in a preferred embodiment U-shaped curved portion 21 fits beneath gooseneck 15 with forward extending members 20 extending over handlebar 14 to, in conjunction with locating members 22, position pack support 10. At the outer ends of each pack engaging portion 18, a pair of forward extending supports 28 are provided to engage the preferred embodiment attachment of pack 12 at pack support pockets 13. A second wire member of pack support 10 includes a closed end portion 30 with curved portions 32 extending therefrom to terminate in spaced opposed inwardly facing segments 34. While the structure of segments 34 is more readily apparent in FIG. 2, from FIG. 1 it will be seen that end portion 30, in the particular embodiment illustrated, extends over gooseneck 15 and under handlebars 14. Clamp member 38, preferably curved to cradle segments 34 in the concave section thereof. A second clamp plate 40 is positioned, again with concave sections which are adapted to engage forward extending members 20, is located at the upper portion of pack support 10, with a bolt 42 extending through both clamp plate 40 and clamp member 38 to be engaged by wing nut 44 thereby permitting a firm clamping action between forward extending members 20, and opposed segments 34, to securely position pack support 10 at the intersection of handlebar 14 and gooseneck 15. Since U-shaped curved portion 21, in the illustrated example, extends under gooseneck 15 while end portion 30 extends over gooseneck 15, rotation of pack support 12 in either direction around handlebar 14 is positively precluded.

While pack support 10 is firmly and positively clamped to the intersection of handlebar 14 and gooseneck 15, removal is readily accomplished by loosening wing nut 44 a limited distance along bolt 42 to permit clamp member 38 to be removed from opposed segments 34.

Figure 3:
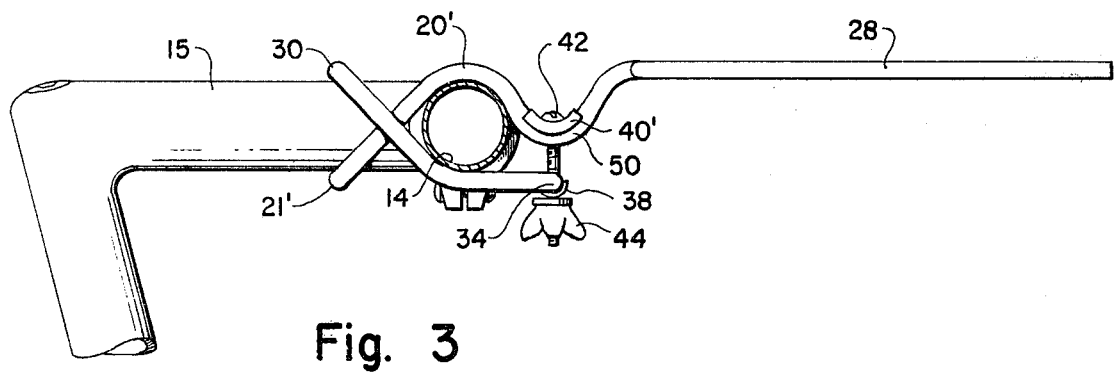
FIG. 3 is a side, sectional view of another embodiment of a bicycle pack support in accord with the instant invention.
Figure 4:
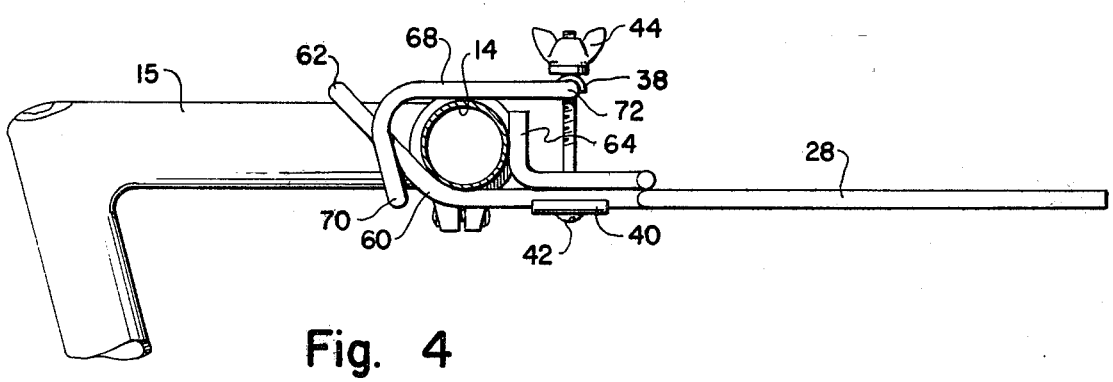
FIG. 4 is a side, sectional view of yet another embodiment of a bicycle pack support in accord with the instant invention.

Other functionally identical but structurally variant embodiments of the invention are shown in FIGS. 3 and 4. For instance, in FIG. 3, the pack support is in many respects similar to that of FIG. 1, but U-shaped curved portion 21 joins a pair of downward extending curved portions 20' which curve over the top of handlebar 14 into a compound curved segments 50. Since curved segments 50 are forward of handlebar 14, the function of locating members 22 of the embodiment of FIG. 1 is served by curved portion 20' and curved segments 50. Also, clamp plate 40' is configured to accommodate curved segments 50, as shown, but is functionally identical to clamp plate 40 of FIG. 1. Otherwise, the embodiment of FIG. 3 is substantially identical with that of FIG. 1, i.e., end portion 30, opposed segments 34, bolt 42 and nut 44 are essentially the same in structure and function as discussed above.

The variation of FIG. 4 in essence is the embodiment of FIG. 1 in an inverted position with appropriate rebending of the wire to provide otherwise identical forward extending supports 28 in the appropriate substantially horizontal orientation. As shown, curved portion 60 of the pack engaging member are positioned under handlebar 14 and U-shaped curve portion 62 positioned over gooseneck 15, with locating members 64 including upward extending portions to engage the forward surface of handlebar 14. As illustrated, if only the first described member were present, support portions 28 would not be secured, but would rotate downward. However, the second member, which includes a pair of wire members 68 bearing upon the upper portion of handlebar 14 and a closed end portion 70 is again clamped to the first member at opposed segments 72 utilizing identical clamp member 38 and clamp plate 40 as described in FIG. 1, with the exceptions that clamp member 38 is positioned in the upper position and clamp plate 40 is positioned below. With the tension between the two members induced by bolt 42 with wing nut 44 tightened thereon, supports 28 are again firmly clamped in the desired position and precluded from rotation around handlebar 14 in either direction.

Accordingly, it will be seen that while structural arrangements differ somewhat in the embodiments of FIGS. 1 and 2, and those of FIGS. 3 and 4, a common structural and functional arrangement is found in all of the embodiments, i.e., of two members with one of the members going over the gooseneck and under the handlebar and the other going under he gooseneck and over the handlebar, with the two members being clamped together. While a bolt and nut arrangement is illustrated as the preferred clamping means, other arrangements are also contemplated though not illustrated. For instance, instead of bolt 42 a rubber member could be employed and distended to engage the two members with the elastic contraction serving to provide the clamping action. Also, while it is preferred that the member not directly carrying the pack be configured to cross the pack carrying member on the outer sides thereof, as illustrated, the support would be functional in the opposite arrangement.

In summary, the pack support in accord with the instant invention provides for two members, preferably of heavy wire, one of which is positioned under the gooseneck and over the handlebar, and the other of which is position over the gooseneck and under the handlebar, with clamping means positioned preferably immediately forward of the handlebars to secure both members together. One of the members, preferably that positioned inside the other at the intersection of the two behind the handlebar, carries a bag attachment means, which in the preferred embodiment is a pair of bifurcated forward extending support members which engage pockets defined in a pack. Again, preferably a second wire locating member is positioned on the pack supporting member at the portion whereat the support diverges, but other means, such as a compound curve over and around to the front portion of the handlebar serves the same purpose as the locating member. Also, while the often used resilient cords extending from the pack to a portion of the bicycle to stabilize the pack support are no longer required with the pack support of the instant invention, in some instances similar resilient members may extend from the pack to stabilize the pack itself, though such stabilization would be redundant for purposes of the pack support.

While only limited versions of the present invention have been presented in the embodiments illustrated and described, it is apparent that various changes and modifications will be evident to those skilled in the art, and that such changes may be made without departing from the scope of the invention as defined by the following claims.

What is claimed is:

1. A support to secure a pack to the handlebar structure of a bicycle at the intersection of the bicycle gooseneck and handlebar, the support comprising:
   first and second elongated component formed symetrically at least at the portion adapted to engage the bicycle handlebar, each of the first and second components having a closed end, one of the components being adapted to extend over the bicycle gooseneck and under the handlebar and the other component being adapted to extend under the gooseneck and over the handlebar with the closed end of each component engaging the intersection of the handlebar and gooseneck,
   means included on one of the components to engage and support a handlebar pack, and
   releasable clamping means extending between the first and second components at a position forward of the handlebar engaging portions to clamp the first and second components around the handlebar and preclude rotation of the support in any direction.

2. A support as set forth in claim 1 in which one of the components includes a pair of locating members attached thereto on either side of the handlebar engaging portion and having leg members extending substantially perpendicular to the component at positions adapted to engage the leg members with the forward surface of a bicycle handlebar.

3. A support as set forth in claim 1 in which one component included adjacent the closed end portion defines a pair of parallel, compound curves at the bicycle handlebar engaging portion and extending more than ninety degrees in one length of each curve to provide location of the component.

4. A support as set forth in claim 1 in which the clamping means comprise a first plate adapted to engage one of the components, a second plate adapted to engage the other of said components, and a threaded fastener extending through the plates to releasably clamp the members together.

5. A support as set forth in claim 1 in which the component including the pack attachment means extends under the gooseneck at the closed end portion thereof and over the handlebars with the pack attachment means extending forward thereof.

6. A support as set forth in claim 1 in which the component including the pack attachment means extends over the gooseneck at the closed end portion thereof and under the handlebars with the pack attachment means extending forward thereof.

7. A support as set forth in claim 1 in which the pack support means comprise first pack support portions which diverge outwardly from one another adjacent the handlebar engaging portion of the component, and second pack support portions at each outer reach of the first pack support portion, extending forward in a parallel manner in a direction away from the closed ends of the support components, and adapted to engage pockets defined on a bicycle pack.

8. A support as set forth in claim 7 in which a pair of reinforced members are attached to and extend around the curves between the handlebar engaging portion and the first pack support portions.

9. A support for a bicycle pack adapted to be attached to the gooseneck and handlebar intersection of a bicycle, the support comprising,
   a pair of first and second wire support components, each being formed with a closed end portion and extending from the closed portion in a symetrical manner, one of the components including a U-shaped closed end portion adapted to engage a gooseneck, and parallel wire legs adapted to engage a handlebar extending from the U-shaped curved portion, and the other component having a closed end portion adapted to engage a gooseneck, and broad enough to extend outside of the U-shaped closed end portion and legs of the first component, and a pair of leg portions extending from the closed end portion and terminating in inwardly facing spaced segments,
   clamping means adapted to engage the parallel legs of the first component, and the inward extending segments of the second component in a releasable manner, and
   means adapted to secure and support a bicycle pack on the first component.

10. A support as set forth in claim 9 in which the first and second components are configured with one adapted to fit under a gooseneck and over a handlebar and the other adapted to fit over a gooseneck and under a handlebar with the closed end section fitting outside of the U-shaped curved portion.

11. A support as set forth in claim 10 in which the U-shaped curved portion comprises a portion of the first component.

12. A support as set forth in claim 9 in which the clamping means comprise a clamp plate having spaced parallel grooves defined therein adapted to fit and slide along the parallel wire legs, a clamp member having a concave surface extending transverse to the clamp plate grooves and adapted to receive the inwardly facing spaced segments, whereby various configurations of handlebar and gooseneck intersections may be accommodated by a given pair of first and second wire support components.

* * * * *